Jan. 1, 1935.  H. G. DANIELS  1,986,715
POTATO HARVESTER
Filed Nov. 14, 1932
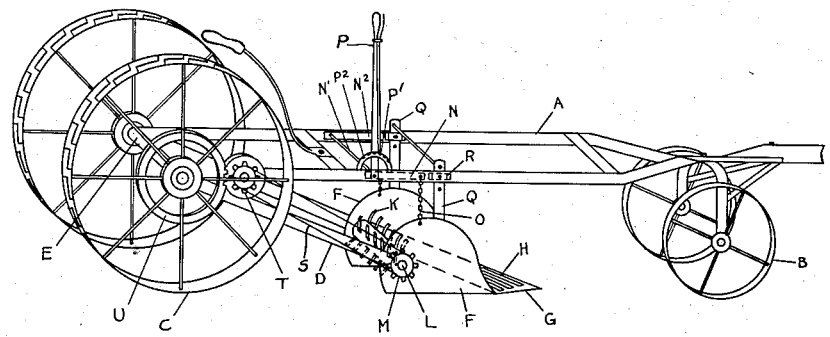
Fig 1.
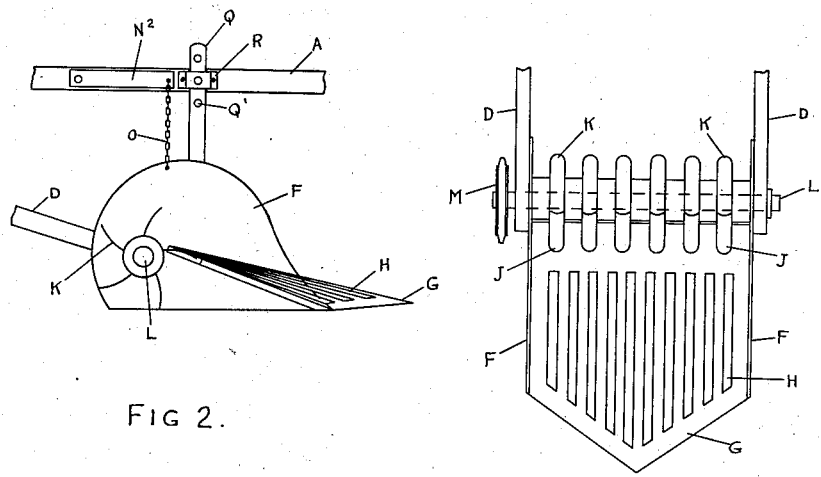
Fig 2.
Fig 3.
Inventor:
Henry George Daniels
By
Attorney Patented Jan. 1, 1935

1,986,715

UNITED STATES PATENT OFFICE 1,986,715

POTATO HARVESTER

Henry George Daniels, Yeronga, near Brisbane, Queensland, Australia

Application November 14, 1932, Serial No. 642,620
In Australia November 16, 1931

1 Claim. (Cl. 55—109)

This invention relates to a potato harvester, and has for its object the provision of means whereby potatoes may be quickly taken from the soil and be placed in rows ready for picking up. It will of course be understood that other crops such as peanuts, onions, turnips and the like may be harvested without any, or with very little, modification of the invention.

The apparatus for embodying the invention comprises a rectangular framework which at the front is pivoted to a turntable carrying a pair of wheels and pole, and at the rear is mounted upon an axle to which wheels are secured.

Pivoted to the rear axle are share supports which are adapted to lie between and beneath the said framework. At the outer ends of the supports which extend to near the centre of the framework cheek pieces are mounted between which a share is secured and is adapted to be raised and lowered as required by a bellcrank lever pivoted to the framework one leg of said lever being connected by a chain or link to the cheek piece. If desired the bellcrank may be secured to a spindle on the framework and work in conjunction with an arm at the other end of the spindle, thus providing a lift at each cheek. A pawl and ratchet may be provided on the hand lever for adjustment.

In addition I may provide an upright upon each cheek adapted to pass through guides on the framework, holes being made at intervals in said uprights through any pair of which a pin may be passed above the framework to maintain a desired depth for the share. The share is adapted to pass beneath the surface and throw the soil and potatoes between the cheeks. Between the cheeks and towards the rear of them a spindle is mounted carrying a series of fingers or prongs set in rows—for example five rows. The fingers are rotated by the spindle which may be driven by a belt, chain or gearing from the rear axle or wheels.

In rotating the fingers pass through slots in the rear extended portion of the share, said slots being slightly larger than the fingers.

While the apparatus is being transported the cheek pieces and adjacent parts may be lifted by the hand lever and be held well above the roadway. When being started to work the cheek pieces are lowered and the share allowed to assume its correct depth in the soil. At this depth it is set by the pin passing through a pair of holes in the uprights from the cheeks.

As the apparatus moves forward the soil and potatoes are caught up by the share and passed back to between the cheeks. In their passage they move over the slots and are met by the fairly rapidly moving fingers which disintegrate the soil loosening the potatoes and throwing the loose soil and potatoes to the rear. In the resulting scatter the potatoes are left in a line above the soil and may be collected with ease.

In order that the invention may be better understood reference will be had to the accompanying drawing wherein:—

Figure 1 is a pictorial view of the potato harvester;

Figure 2 is a side elevation of the potato harvesting means with one cheek removed, and Figure 3 is a plan view of the same.

Referring to Figure 1 the framework A is mounted upon forward wheels B and rearward wheels C, the former adapted to be turned for steering purposes. Two share supports D are pivotally mounted upon the rear axle E at one end and at the other end are secured to cheek pieces F. Between these cheek pieces F a share G is held. The share G has a series of slots H at the front and another series of slots J at the rear (see Figure 3). The front slots H enable soil to pass through whilst the rear slots J permit of rotating fingers K upon a spindle L to pass freely. The spindle L is mounted in bearings in cheek pieces F, and one end passes through a cheek piece F having secured to it a sprocket M or the like by which it is driven.

The share G and spindle K carried by cheek pieces F may be raised and lowered by a bellcrank lever N, one leg being attached by a chain O or the like to the top of a cheek piece F. The bellcrank N may be secured to a spindle N' mounted on the framework A and at its other end is connected to a lever N2 which is similarly connected by a chain O to the cheek piece F. This bellcrank N is operated by a hand lever P governed by a pawl P' and ratchet P2.

A pair of uprights Q are secured at their lower end to the top of cheek pieces F and at their upper ends pass through guides R upon the framework A. These uprights have holes Q' through which, and holes in the framework A, a pin may be passed to secure the share in fixed position relative to the framework. The uprights Q are so attached to the shares that the holes Q' will register with the holes in the framework A as the shares are raised or lowered to the desired position. The spindle L may be driven by a chain S passing round sprocket M on the said spindle L, and sprocket T on the framework A adjacent the rear axle. The sprocket T may be integral with a cog wheel meshing with another cog wheel U on the rear axle, thus giving the spindle L and fingers K a motion contrary to the rear wheels.

I claim:

A potato harvester consisting of a framework mounted upon wheels, a rear axle, a share mounted on arms, the free ends of which are pivoted to the rear axle, said share being positioned centrally of the framework, means including a bell-crank lever and an associated pawl and ratchet for raising and lowering the share to various elevations beneath the framework, a cheek positioned on each side of the share for guiding the dirt and potatoes lifted by the share toward the rear as the harvester moves along, means including a link attached to each cheek and provided with bolt holes adapted to register with bolt holes in said framework for securing the share in adjusted positions to prevent accidental raising and lowering thereof, the rear portion of said share having a plurality of longitudinal slots extending inward from the rear edge thereof, a shaft rotatably mounted in the cheeks adjacent the rear thereof, a plurality of fingers carried by the shaft and adapted to move through said slots to throw the potatoes rearwardly in straight rows, and means for transmitting rotary motion from the wheels of the harvester to said rotary shaft.

HENRY GEORGE DANIELS.